US010589652B2

(12) United States Patent
Preisler et al.

(10) Patent No.: US 10,589,652 B2
(45) Date of Patent: Mar. 17, 2020

(54) MECHANIZED TRAY TABLE ASSEMBLY

(71) Applicant: JVIS-USA, LLC, Sterling Heights, MI (US)

(72) Inventors: Darius J. Preisler, Macomb, MI (US); Donald R. Schaefer, Waterford, MI (US); Jason T. Murar, Macomb, MI (US)

(73) Assignee: JVIS-USA, LLC, Sterling Heights, MI (US)

( * ) Notice: Subject to any disclaimer, the term of this patent is extended or adjusted under 35 U.S.C. 154(b) by 128 days.

(21) Appl. No.: 15/845,444

(22) Filed: Dec. 18, 2017

(65) Prior Publication Data

US 2019/0184884 A1    Jun. 20, 2019

(51) Int. Cl.
| | |
|---|---|
| *B60N 3/00* | (2006.01) |
| *A47B 1/10* | (2006.01) |
| *B60R 11/02* | (2006.01) |
| *B60N 2/68* | (2006.01) |
| *B60R 11/00* | (2006.01) |

(52) U.S. Cl.
CPC ............... *B60N 3/004* (2013.01); *A47B 1/10* (2013.01); *B60N 2/68* (2013.01); *B60R 11/0252* (2013.01); *B60R 2011/0075* (2013.01); *B60R 2011/0082* (2013.01)

(58) Field of Classification Search
CPC .. B60N 3/004; B60N 2/68; A47B 1/10; B60R 11/0252
See application file for complete search history.

(56) References Cited

U.S. PATENT DOCUMENTS

| | | | |
|---|---|---|---|
| 1,333,301 | A | 3/1920 | Fohman |
| 1,790,468 | A | 1/1931 | Frank et al. |
| 1,809,866 | A | 6/1931 | Riesche |
| 1,887,102 | A | 11/1932 | Mathie |
| 2,132,279 | A | 10/1938 | Wicknick et al. |
| 2,168,210 | A | 8/1939 | Hawksley |
| 2,249,287 | A | 7/1941 | Gearhart et al. |

(Continued)

FOREIGN PATENT DOCUMENTS

| | | |
|---|---|---|
| KR | 100966376 B1 | 6/2010 |
| KR | 20110004602 A | 1/2011 |
| KR | 101454923 B1 | 10/2014 |

OTHER PUBLICATIONS

United States Patent and Trademark Office, Non-Final Office Action for U.S. Appl. No. 15/844,787, dated Jun. 22, 2018.

*Primary Examiner* — Anthony D Barfield
(74) *Attorney, Agent, or Firm* — Brooks Kushman P.C.

(57) ABSTRACT

A mechanized tray table assembly capable of automatically deploying from a stowed position in a vehicular seat back towards a use position within a passenger compartment of a vehicle is provided. The assembly includes a support structure adapted to the coupled to the seat back, a tray support and a tray subassembly supported for rotation about a rotational axis by the tray support. The tray subassembly includes a lid and a container having an opening for allowing ingress and egress of items into and out of a storage compartment of the container, respectively, in an open position of the lid. An actuator subassembly is mounted on the support structure and is connected to the tray support to lift the tray support to deploy the tray subassembly along a predetermined non-linear path from the stowed position to the use position through stored potential energy without consuming electrical energy.

20 Claims, 6 Drawing Sheets

(56) References Cited

U.S. PATENT DOCUMENTS

| | | | |
|---|---|---|---|
| 2,619,395 | A | 11/1952 | Kent |
| 2,963,078 | A | 12/1960 | Ferrelle |
| 3,795,422 | A | 3/1974 | Robinson et al. |
| 4,973,017 | A | 11/1990 | Takagi |
| 5,931,527 | A | 8/1999 | D'Onofrio et al. |
| 7,607,726 | B2 | 10/2009 | Orlo et al. |
| 7,963,231 | B2 | 6/2011 | Osborne et al. |
| 8,312,819 | B2 | 11/2012 | Vignal et al. |
| 8,695,513 | B2 | 4/2014 | Figueras Mitjans |
| 9,180,805 | B2 | 11/2015 | Millan |
| 9,352,840 | B2 | 5/2016 | Schultheis |
| 9,731,829 | B2 | 8/2017 | Gow et al. |
| 9,955,779 | B2 | 5/2018 | Hoeftberger et al. |
| 2007/0227407 | A1 | 10/2007 | Cartensen |
| 2011/0278885 | A1 | 11/2011 | Procter et al. |
| 2013/0093220 | A1 | 4/2013 | Pajic |
| 2014/0042781 | A1 | 2/2014 | Reeves |
| 2014/0241650 | A1 | 8/2014 | Khankal et al. |
| 2014/0292042 | A1 | 10/2014 | Stewart et al. |
| 2016/0250958 | A1 | 9/2016 | Saada et al. |
| 2017/0313258 | A1 | 11/2017 | Argyle et al. |

MECHANIZED TRAY TABLE ASSEMBLY

CROSS-REFERENCE TO RELATED APPLICATIONS

This application is related to U.S. patent application entitled "Powered Mechanized Tray Table Assembly" filed on the same day as this application.

TECHNICAL FIELD

This invention is generally related to deployable tray table assemblies for use in passenger compartments of vehicles and, in particular, to such assemblies which are deployable from a stowed position in a vehicular seat back.

OVERVIEW

As shown in FIG. 1, generally, seats installed in an interior of a vehicle are typically classified into a bucket seat for a passenger and a bench seat on which two or more passengers can simultaneously seat. A head restraint is installed at an upper end portion of a backrest. A seat back table that can be folded or unfolded backward may be installed at the backrest for the sake of a rear passenger's convenience.

Such a seat back is installed on the rear of a seat backrest so that a backseat passenger can use the seat back table for reading, handwriting, or a simple dining table, and is formed to be unfolded when it is used and folded when it is not used.

As described in patent document US 2014/0042781, vehicle interiors fulfil a dual role in providing safety for the occupants of the vehicle as well as comfort. This includes providing storage space for the ever increasing number or essential objects that a person may carry with them. In particular, there is an increase of personal electronic devices ("PEDs") being used and carried by people. Storage space in a vehicle is at a premium, particularly for occupants in the back seats of a vehicle who are unable to directly assess many of the conventional storage compartments of a vehicle during travel. This includes for example the glove compartment, compartments located on the dashboard or center console of a car, or even side pockets in the front doors or storage spaces under the headliner.

As described in patent document US 2017/0313258, in many instances, passenger vehicles, such as aircraft, buses, trains, ships and automobiles, include passenger seats with a wide assortment of portable electronic and entertainment options to encourage passengers to remain seated as much as possible during transport for safety, crew mobility and to enable efficient cabin service. Some passenger seats may provide video and audio entertainment, including television, video games, internet access, and other on-board entertainment ("OBE") or in-flight entertainment ("IFE") components. Typically, these entertainment devices are mounted in the seat backs and arm rest of the passenger seats.

With the advent of PEDs, such as tablet computers, mobile phones, smart phones, handheld video game systems, personal digital assistants, palmtop computers, DVD players, data and audio-video media, multi-media enabled devices, and other similar electronic devices, many passengers prefer to use their own PEDs, rather than the OBE or IFE components that are mounted in the passenger seats.

The rate at which PEDs, namely mobile phones, tablets, portable computers, personal digital assistants ("PDAs"), have been evolving has been exponential. These devises are constantly increasing in functions and decreasing/altering in size, making them more portable and at the same time able to perform more tasks. This evolution has led to passengers carrying their personal information and media on these devices with the expectation of using them while traveling.

To this point, there have been very few examples of the integration of these PEDs into airplane seats in any specific way to the seat, other than providing a location on a tray table, such as a groove to hold the PED, and sometimes a power connection to charge them. Because the mounting location is in the tray table, which must be stowed during certain times during flight, there is still a need for passengers to have a way to 'hold' or 'store' these PEDs while in flight in a manner that allows the PEDs to be used and enjoyed at any given moment. Furthermore, when the mounting location is a groove, the design inherently limits the thickness of the PEDs that may be secured in that location based on the thickness of the groove. Also, by using the tray table to support the PED, it is not positioned at eye level, which generates discomfort after prolonged periods of time.

Other solutions to date involve attaching a case (either provided by airlines or customer-purchased) to the backs of passenger seats as an add-on device. A drawback to this solution is that most cases are not adaptable to a large range of differing sizes and shapes of PEDs (e.g. a case for a mobile phone often is not sized to accommodate a tablet or surface computer). For example, the cases offered by one airline can only hold iPads, so other types of tablets or cellphones are not supported. An example of an improvement on conventional cases is shown in U.S. Publication No. 2011/0278885, wherein a cradle formed of multiple adjustable arms to support PEDs of varying sizes and shapes is configured to mount to a port within a passenger seat, and the connection between the cradle and the port also a power connection, and/or a communication connection to the OBE or IFE systems and/or the internet to the PED.

When such cases are provided by the passengers, the passenger is able to ensure that the case will fit his or her device, but cannot be sure that the case will fit all types of passenger seats. As a result, the passenger may be forced to purchase an item that he or she may not be able to use on any other occasion. When provided by the airline, this solution creates the additional problem of having to carry on the plane a large amount of cases to provide for the passengers, while also having to ensure that passengers will not take the holders with them after the flight.

In some cases, it may be desirable to provide a way for passengers to connect their PEDs to the OBE or IFE systems, so that they may use their own PEDs in lieu of the OBE or IFE systems. In other cases, it may be desirable to provide a way for passengers to connect their PEDs to the OBE or IFE systems to use in conjunction with the system's video display or to receive power for their PEDs or otherwise.

As a result, there is still a need for a support for PEDs that is always available and adaptable to a wide range of PED sizes, shapes, and thicknesses, and that does not create the need for an extra case or coupling assembly. Such a solution eliminates the need for airlines to provide a large number of cases, which represents additional weight and the need for additional storage space, as well as eliminating the costs for passengers to purchase an additional case for his or her PED. Such a solution also allows passengers to use their PEDs with or without a case, and to make the tray tables available for meals, documents, or any other object, or to allow passengers to stow the tray tables while still having the PEDs securely placed for use and/or viewing.

U.S. Pat. No. 9,352,840 discloses a tray table for use with a passenger seat of a transportation vehicle. The tray table may be moveable between a deployed position and a stowed position relative to a seat. The tray table may include a storage compartment for storing belongings of a passenger. A lid may be provided for covering an opening of the storage compartment. A portion of the lid may be transparent such that contents of the storage compartment is in the deployed position. A portion of a storage compartment bottom may be transparent such that contents of the storage compartment may be readily viewed by a passenger when the tray table is in the stowed position. The tray table may have any number of storage compartments and a single lid or multiple lids may be used to cover the storage compartment openings.

Patent document U.S. 2013/0093220 discloses a tray table with a rotatable inner tray for electronic device docking.

U.S. Pat. No. 7,607,726 discloses a vehicle seat has a seat bottom and a seat back, which pivots at a rear side of the seat bottom. Within the rearward-facing surface of the seat back, a seat back tray is housed. When in a front passenger seat that is folded forward, the seat back tray is accessible by a vehicle driver. To adjust the tray horizontally, a tray top pivots relative to and above a non-pivoting tray top. A track within the tray provides a guide for movement of the pivotable tray top. A scissor lift coupled to an adjustment mechanism including either a hand crank or electric motor, may raise and lower the tray from a retracted position to an extending position, and be fixed at any intermediary position.

The following U.S. patent documents are also related to at least one embodiment of the present invention: U.S. Pat. No. 8,312,819; 2014/0241650; 2014/0292042; and 9,180,805.

The term "vehicle", as used herein, includes any conveyance, or model of a conveyance, where the conveyance was originally designed for the purpose of moving one or more tangible objects, such as people, animals, cargo, and the like. The term "vehicle" does not require that a conveyance moves or is capable of movement. Typical vehicles may include but are in no way limited to cars, trucks, motorcycles, busses, automobiles, trains, railed conveyances, boats, ships, marine conveyances, submarine conveyances, airplanes, space craft, flying machines, human-powered conveyances, and the like.

Despite the above prior art, there is a need for a low cost, compact tray table assembly capable of automatically deploying from a stowed position in a vehicle seat back towards a use position within a passenger compartment of a vehicle.

SUMMARY OF EXAMPLE EMBODIMENTS

An object of at least one embodiment of the present invention is to provide a cost effective, compact assembly, such as a tray table assembly, for a vehicle wherein the assembly is mechanized to automatically deploy from a stowed position in a vehicular seat back towards a use position within a passenger compartment of the vehicle and provides easy access to stowed items such as portable electronic devices ("PEDs") in a container of a tray subassembly.

In carrying out the above object and other objects of at least one embodiment of the present invention, a tray table assembly capable of automatically deploying from a stowed position in a vehicular seat back towards a use position within a passenger compartment of a vehicle is provided. The assembly includes a support structure adapted to be coupled to the seat back, a tray support and a tray subassembly supported for rotation about a rotational axis by the tray support. The tray subassembly includes a lid having open and closed positions and a container having an opening for allowing ingress and egress of items into and out of a storage compartment of the container, respectively, in the open position of the lid. An actuator subassembly is mounted on the support structure and is connected to the tray support to lift the tray support to deploy the tray subassembly along a predetermined non-linear path from the stowed position to the use position through stored potential energy without consuming electrical energy.

The assembly may further include a gesture-actuated latching device having locked and unlocked states for locking and unlocking the tray subassembly, respectively. The latching device prevents movement of the tray subassembly in the locked state and allows movement of the tray subassembly in the unlocked state.

The actuator subassembly may include a biasing mechanism configured to apply an amount of mechanical kinetic energy converted from an amount of stored potential energy to the tray support in such a way that application of the amount of mechanical kinetic energy to the tray support urges movement of the tray support away from the stowed position towards the use position.

The biasing mechanism may comprise of at least one constant force or extension spring.

The assembly further comprise a dampening device configured to dampen movement of the tray support between the stowed position and the use position without consuming electrical energy.

The container may receive electrical wiring to supply electrical power or digital data to the container.

The assembly may further comprise a pair of spaced guide members mounted on the support structure. Each of the guide members may include a rack gear portion and a pair of driving shafts. Each of the shafts may be rotationally supported by the tray support.

The assembly may further comprise a pinion mounted on each of the shafts to rotate therewith. Each of the gears may be engaged with its respective rack gear portion.

The assembly may further comprise a pair of spaced slides to slideably support the container during movement of the container between extended and retracted positions of the container.

The actuator subassembly may retract the tray support from the use position towards the stowed position.

Further is carrying out the above object and other objects of at least one embodiment of the present invention, a non-vehicular tray table assembly capable of automatically deploying from a stowed position in a seat back towards a use position is provided.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
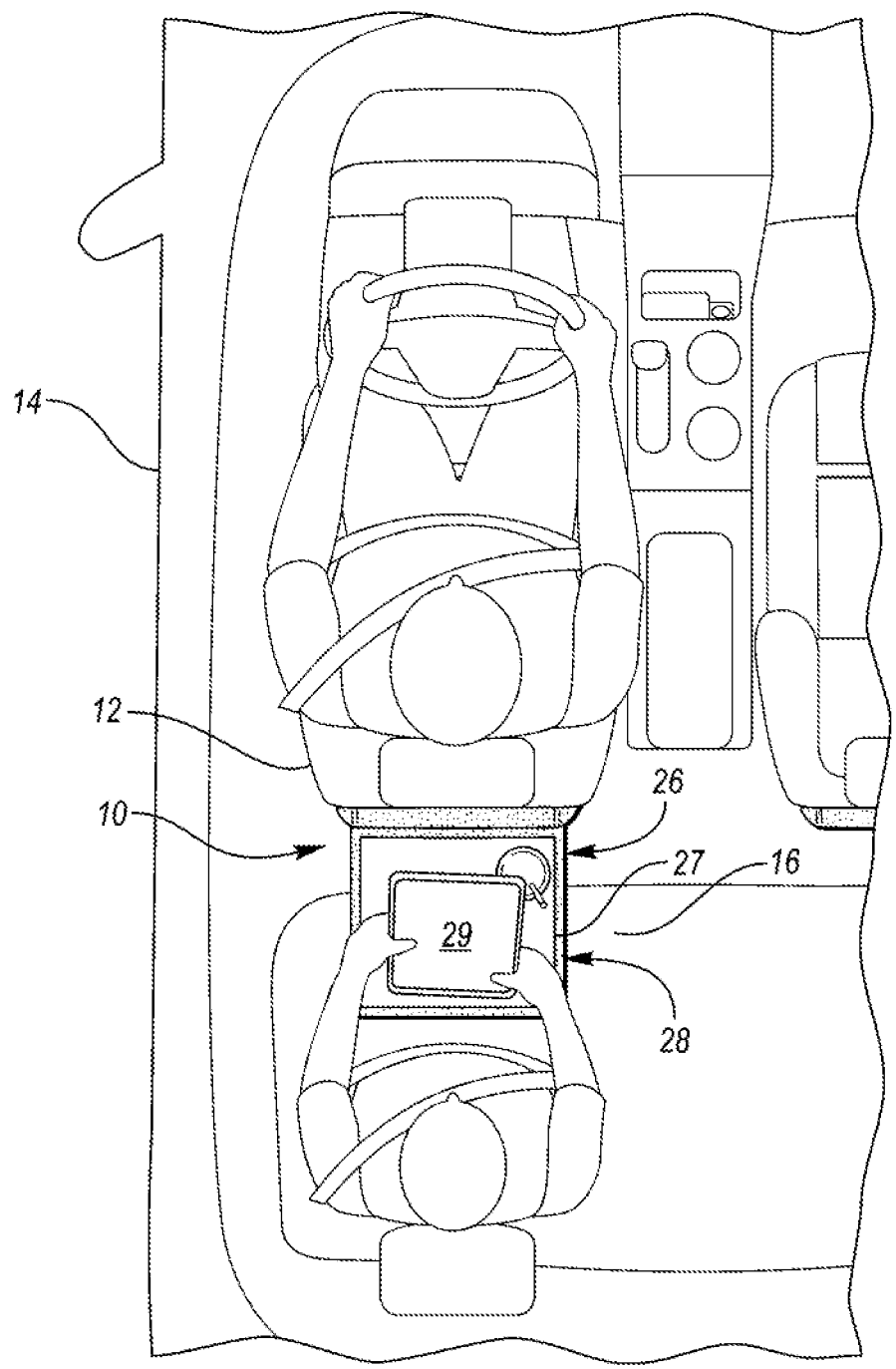
FIG. 1 is a top plain environmental view, partially broken away, of a vehicle interior with a deployed tray table assembly in use by a backseat passenger.
Figure 5:
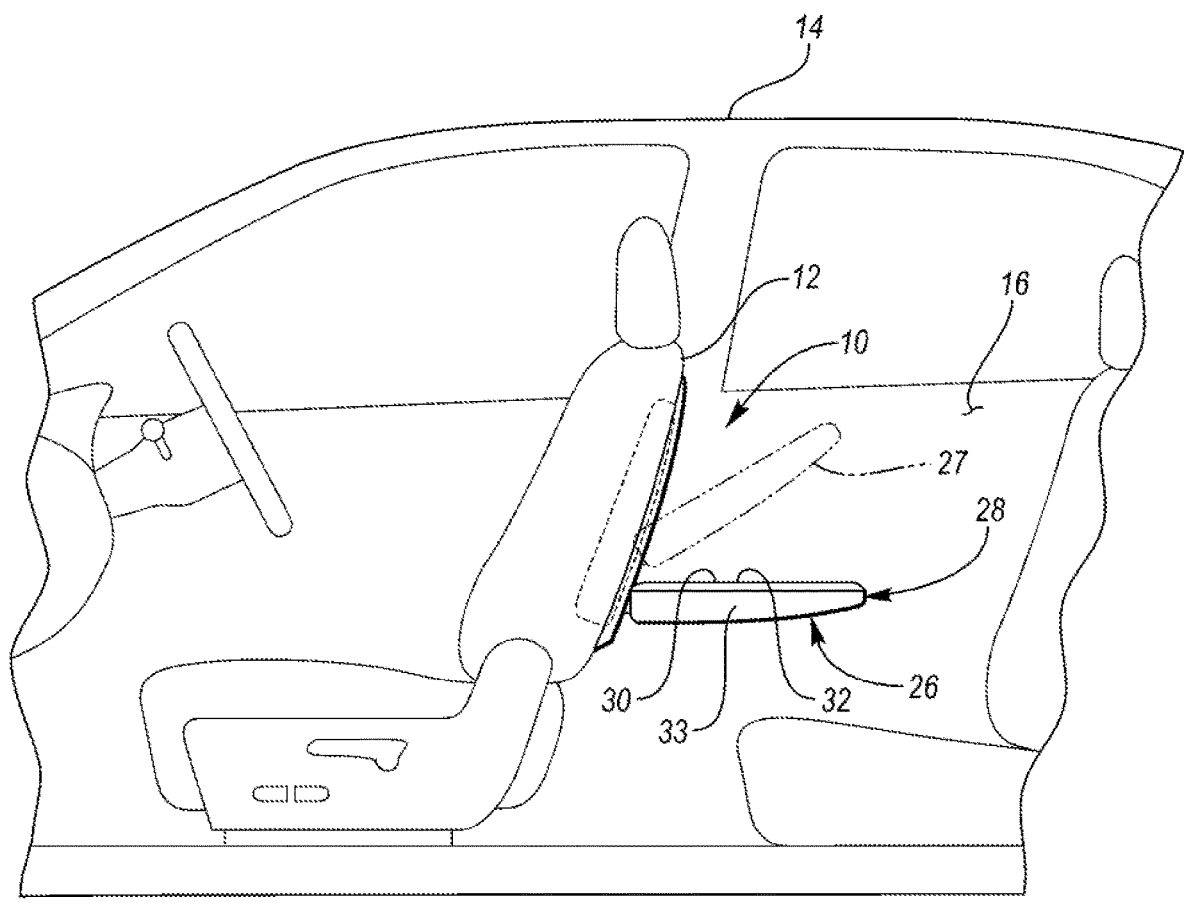
FIG. 5 is a side elevational environmental view, partially broken away, of the tray table assembly in its use position with a lid of a tray subassembly in its open position to allow ingress and egress of items such as one or more PEDs into a storage compartment of a container of the tray subassembly.
Figure 6:
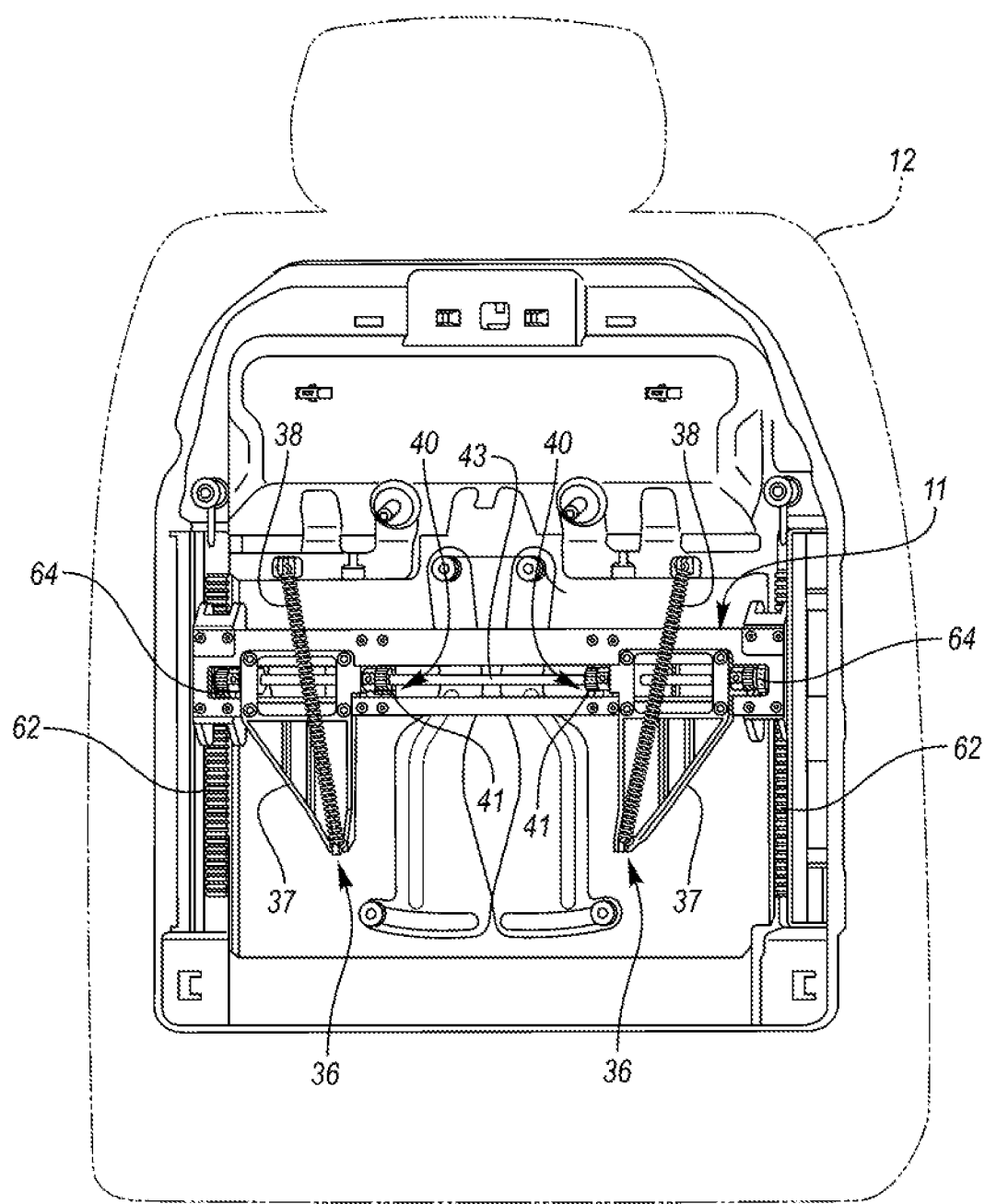
FIG. 6 is a front view similar to the view of FIG. 3, but with the tray support in its raised position.

Referring to FIGS. 1 and 5, there is illustrated an assembly, such as a tray table assembly, generally indicated at 10, capable of deploying from a stowed position in a vehicular seat back 12 towards a use position within a passenger compartment 16 of a vehicle 14.

The assembly 10 includes a tray subassembly, generally indicated at 26, including a lid 27 having open and closed positions and a container, generally indicated at 28, having an opening 30 (FIG. 5) for allowing ingress and egress of items into and out of a storage compartment 32 of the container 28, respectively, in the open position of the lid 27. The items may include one or more portable electric devices (PEDs) such as a PED 29.

The tray subassembly 26 is preferably pivotally mounted on a tray support 11 which in turn, is mounted for linear movement with a support structure, generally indicated at 13, which, in turn, is adapted to be coupled to the seat back 12. The tray support 11 is supported in a stowed position within the seat back 12 for linear movement between upper and lower positions.

The tray support 11 is configured to moveably hold the tray subassembly 26 in the seat back 12 in the stowed position and is configured to allow the stowed item to be removed from the container 28 in the deployed position by a passenger of the vehicle 14. The lid 27 may be spring loaded and hingedly attached to the container 28 by a hinge assembly (not shown).

Figure 2:
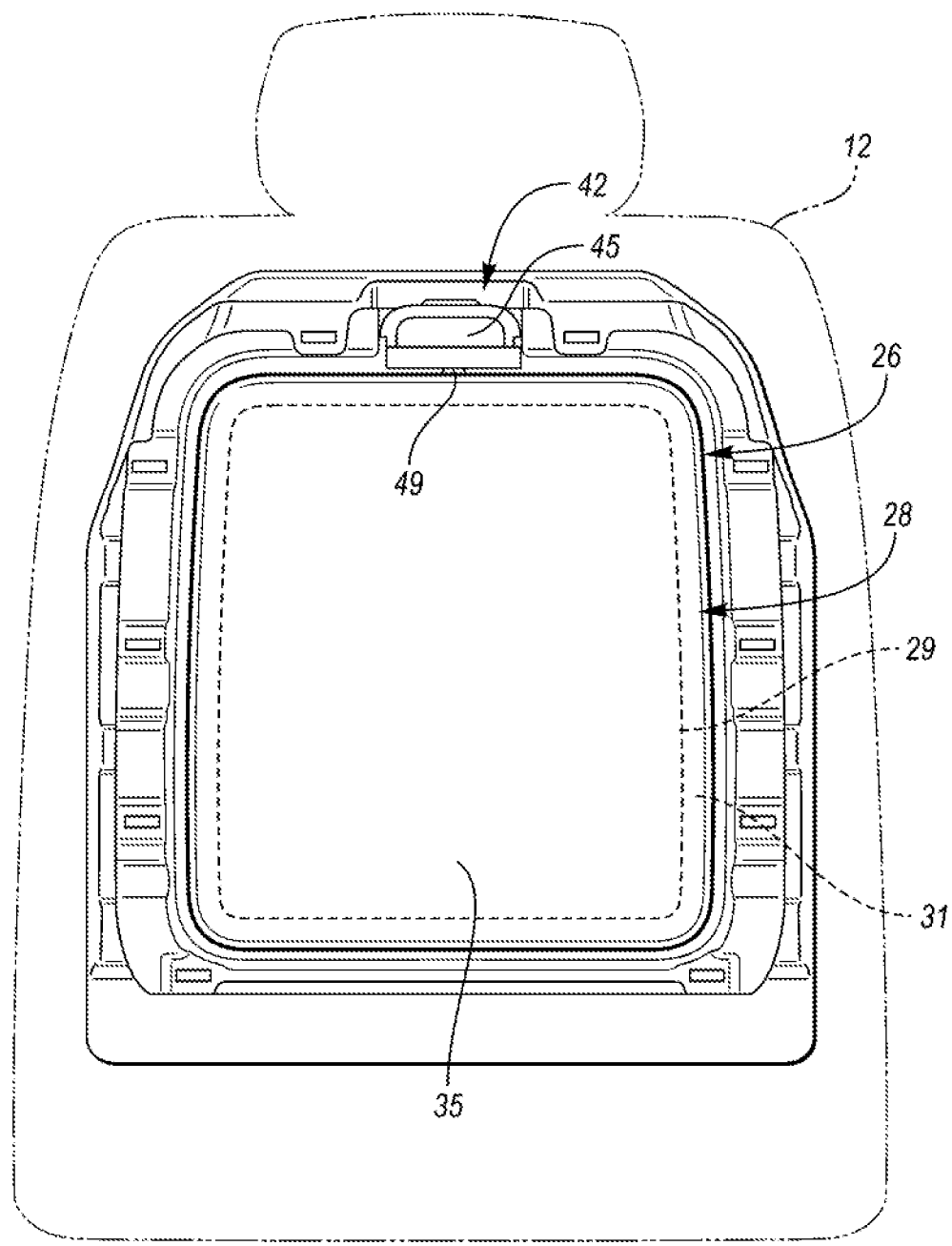
FIG. 2 is a back view of the tray table assembly stowed in a vehicle seat back shown in phantom.
Figure 3:
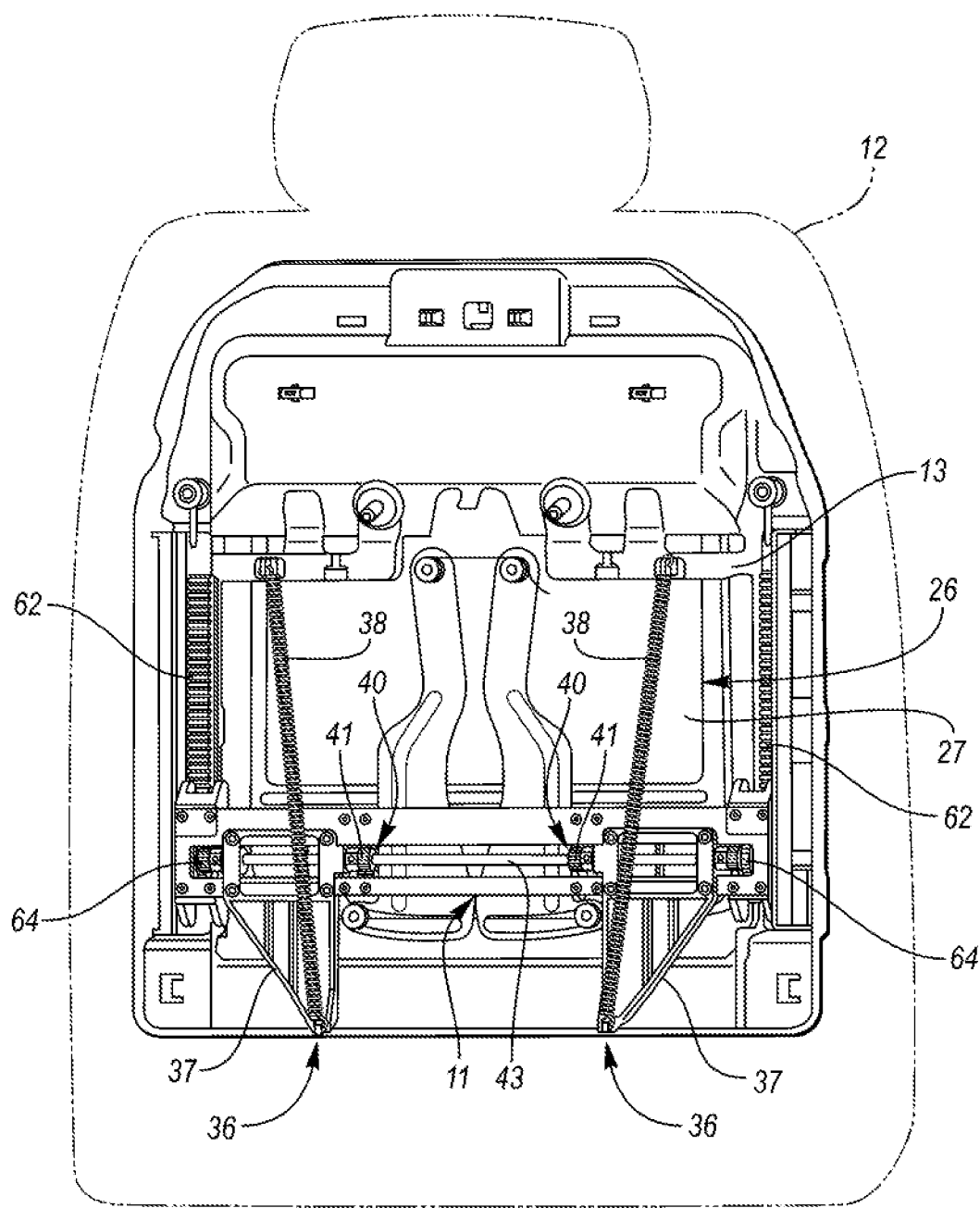
FIG. 3 is a front view of the stowed tray table assembly with its tray support in its lowered position and without a back cushion or covering panel.

The container 28 typically has a bottom panel 35 and side panels 33 to form the container 28. An adjustable insert 31 (indicated by phantom lines in FIG. 2) is formed generally in the shape of the stowed PED 29 and is snuggly fit into the container 28 and thereafter adjusted to hold the PED 29 and thereby prevent the PED 29 from sliding during movement of the container 28.

An actuator subassembly, generally indicated at 36, is configured to controllably move the tray support 11 away from its retracted, lower position towards its extended upper position via stored potential energy. The actuator subassembly 36 may be attached as its opposite ends to the support structure 13 and to left and right spaced brackets 37 of the tray support 11. The actuator subassembly 36 may include a biasing mechanism configured to apply an amount of mechanical kinetic energy converted from an amount of the stored potential energy to the tray support 11 in such a way that application of the amount of mechanical kinetic energy to the tray support 11 lifts the tray support 11 (and, consequently, the tray subassembly 26) away from its retracted, stowed lower position towards its extended, deployed upper position. The biasing mechanism may comprise a pair of constant force or extension springs 38.

The assembly 10 may further include a hydraulic dampening device, generally indicated at 40, configured to dampen movement of the tray support 11 between its retracted position towards its extended position without consuming electrical energy. The dampening device 40 may include a conventional gear damper including a pair of gears 41 rotatably supported on a shaft 43 which is supported on the tray support 11. The gears 41 rotate on a toothed track (not shown) during linear movement of the tray support 11.

The assembly 10 may further include a simple-to-operate, gesture-actuated, latching device, generally indicated at 42, having locked and unlocked states for locking and unlocking the tray subassembly 26, respectively, to the support structure 13. The latching device 42 prevents movement of the tray subassembly 26 away from the support structure 13 in the locked state and allows the tray subassembly 26 to move towards its open, deployed position in the unlocked state by means of the actuator subassembly 36.

The latching device 42 may include a latch coupler or spring-loaded plunger actuated by a button 45 and supported on the support structure 13 and an aperture 47 (FIG. 4) in the container 28 which receives a latching member or pawl 49 which is actuated by the plunger upon manual actuation of the button 45 of the device 42 by a rear-seated passenger of the vehicle 14.

The assembly 10 may further include a pair of spaced slides (not shown) connected to the tray support 11 and side panels 33 of the container 28 to slideable support the tray subassembly 26 during movement of the tray assembly 26 between its extended and retracted positions. The slides may slide on rails (not shown).

Resilient spring bumpers 60 (FIG. 4) located on the support structure 13 bias the tray subassembly 26 towards its open, deployed position. Upon actuation of the latching device 42 by a passenger of the vehicle 14, the bumpers 60 push the tray subassembly 26 a predetermined amount, such as approximately 5 degrees. Thereafter, the biasing mechanism or constant force springs 38 lift the tray subassembly 26 towards its deployed upper position and allow the tray subassembly 26 to rotate to a horizontal position of FIG. 4.

A pair of toothed guide members 62 mesh with pinions 64 rotatably supported on the shaft 43 to guide upward and downward movement of the tray support 11.

Figure 4:
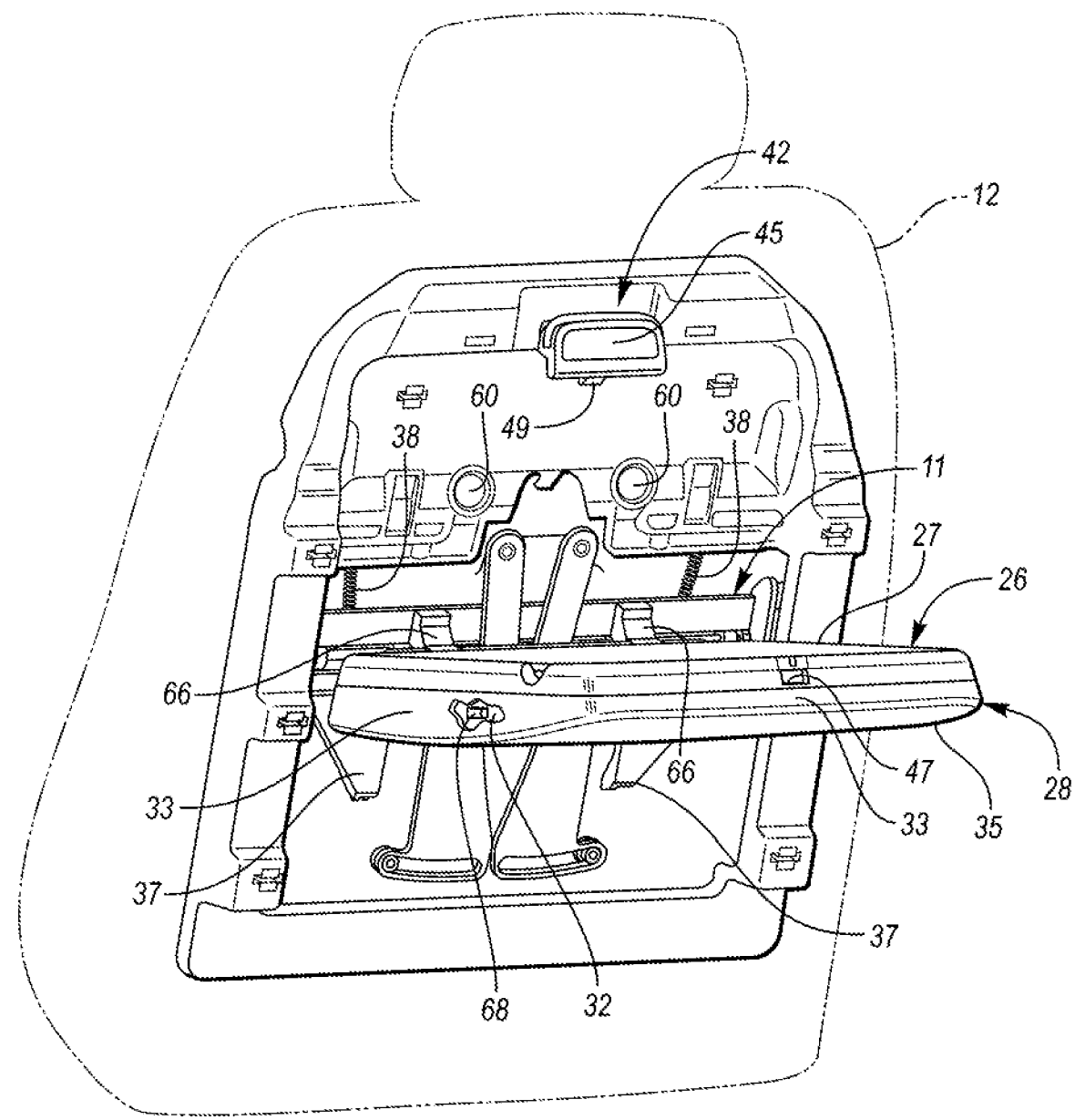
FIG. 4 is a back perspective view of the tray table assembly in its use position without a covering panel.

A pair of spaced brackets 66 (FIG. 4) are supported on the tray support 11 for movement therewith to hold the tray subassembly 26 in its substantially horizontal position in FIG. 4.

One or more connectors such as a connector 68 (FIG. 4) may be provided in the storage compartment 32 to provide electrical power or digital data to a PED located or stored within the container 28 via electrical wiring (not shown). Alternatively, electrical power and digital data may be provided to a PED within the container 28 wirelessly in any well known fashion.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A tray table assembly capable of automatically deploying from a stowed position in a vehicular seat back towards a use position within a passenger compartment of a vehicle, the assembly comprising:
   a support structure adapted to be coupled to the seat back;
   a tray support;
   a tray subassembly supported for rotation about a rotational axis by the tray support wherein the tray subassembly includes a lid having open and closed positions and a container having an opening for allowing ingress and egress of items into and out of a storage compartment of the container, respectively, in the open position of the lid, the container including an adjustable insert-formed to fit into the container and configured to be adjusted to hold a portable electronic device within the insert, thereby preventing the portable electronic device from sliding during movement of the container; and
   an actuator subassembly mounted on the support structure and being connected to the tray support to lift the tray support to deploy the tray subassembly along a predetermined non-linear path from the stowed position to the use position through stored potential energy without consuming electrical energy.

2. The assembly as claimed in claim 1 further comprising a gesture-actuated latching device having locked and unlocked states for locking and unlocking the tray subassembly, respectively, the latching device preventing movement of the tray subassembly in the locked state and allowing movement of the tray subassembly in the unlocked state.

3. The assembly as claimed in claim 1 wherein the actuator subassembly includes a biasing mechanism configured to apply an amount of mechanical kinetic energy converted from an amount of the stored potential energy to the tray support in such a way that application of the amount of mechanical kinetic energy to the tray support urges movement of the tray support away from the stowed position towards the use position.

4. The assembly as claimed in claim 3 wherein the biasing mechanism comprises at least one constant force or extension spring.

5. The assembly as claimed in claim 1 further comprising a dampening device configured to dampen movement of the tray support between the stowed position and the use position without consuming electrical energy.

6. The assembly as claimed in claim 1 wherein the container receives electrical wiring to supply electrical power or digital data to the portable electronic device within the insert.

7. The assembly as claimed in claim 1 further comprising a pair of spaced guide members mounted on the support structure, each of the guide members including a rack gear portion and a pair of driving shafts, each of the shafts being rotationally supported by the tray support.

8. The assembly as claimed in claim 7 further comprising a pinion mounted on each of the shafts to rotate therewith, each of the pinions, being engaged with its respective rack gear portion.

9. The assembly as claimed in claim 1 further comprising a pair of spaced slides to slideably support the container during movement of the container between extended and retracted positions of the container.

10. The assembly as claimed in claim 1 wherein the actuator subassembly retracts the tray support from the use position towards the stowed position.

11. A tray table assembly capable of automatically deploying from a stowed position in a seat back towards a use position, the assembly comprising:
   a support structure adapted to be coupled to the seat back;
   a tray support;
   a tray subassembly supported for rotation about a rotational axis by the tray support wherein the tray subassembly includes a lid having open and closed positions and a container having an opening for allowing ingress and egress of items into and out of a storage compartment of the container, respectively, in the open position of the lid, the container, including an adjustable insert-formed to fit into the container and configured to be adjusted to hold a portable electronic device within the insert, thereby preventing the portable electronic device from sliding during movement of the container; and
   an actuator subassembly mounted on the support structure and being connected to the tray support to lift the tray support to deploy the tray subassembly along a predetermined non-linear path from the stowed position to the use position through stored potential energy without consuming electrical energy.

12. The assembly as claimed in claim 11 further comprising a gesture-actuated latching device having locked and unlocked states for locking and unlocking the tray subassembly, respectively, the latching device preventing movement of the tray subassembly in the locked state and allowing movement of the tray subassembly in the unlocked state.

13. The assembly as claimed in claim 11 wherein the actuator subassembly includes a biasing mechanism configured to apply an amount of mechanical kinetic energy converted from an amount of the stored potential energy to the tray support in such a way that application of the amount of mechanical kinetic energy to the tray support urges movement of the tray support away from the stowed position towards the use position.

14. The assembly as claimed in claim 13 wherein the biasing mechanism comprises at least one constant force or extension spring.

15. The assembly as claimed in claim 11 further comprising a dampening device configured to dampen movement of the tray support between the stowed position and the use position without consuming electrical energy.

16. The assembly as claimed in claim 11 wherein the container receives electrical wiring to supply electrical power or digital data to the portable electronic device within to insert.

17. The assembly as claimed in claim 11 further comprising a pair of spaced guide members mounted on the support structure, each of the guide members including a rack gear portion and a pair of driving shafts, each of the shafts being rotationally supported by the tray support.

18. The assembly as claimed in claim 17 further comprising a pinion mounted on each of the shafts to rotate therewith, each of the pinions being engaged with its respective rack gear portion.

19. The assembly as claimed in claim 11 further comprising a pair of spaced slides to slideably support the container during movement of the container between extended and retracted positions of the container.

20. The assembly as claimed in claim 11 wherein the actuator subassembly retracts the tray support from the use position towards the stowed position.

* * * * *